(12) United States Patent  
Paris et al.

(10) Patent No.: US 8,376,610 B2
(45) Date of Patent: Feb. 19, 2013

(54) AUTOMATED SELF CALIBRATION IN OPTICAL DETECTORS

(75) Inventors: Sam Paris, Chicago, IL (US); Charles Steven Pint, Evanston, IL (US)

(73) Assignee: Fluke Corporation, Everett, WA (US)

(*) Notice: Subject to any disclaimer, the term of this patent is extended or adjusted under 35 U.S.C. 154(b) by 1136 days.

(21) Appl. No.: 12/207,144

(22) Filed: Sep. 9, 2008

(65) Prior Publication Data

US 2010/0061419 A1  Mar. 11, 2010

(51) Int. Cl.
*G01K 15/00* (2006.01)

(52) U.S. Cl. ............................. 374/2; 374/128; 374/133

(58) Field of Classification Search ................. 374/1–2, 374/100, 128, 133
See application file for complete search history.

(56) References Cited

U.S. PATENT DOCUMENTS

| | | | | |
|---|---|---|---|---|
| 3,081,399 | A * | 3/1963 | Schwarz | 246/169 D |
| 3,914,610 | A * | 10/1975 | Bigbie | 250/338.1 |
| 4,243,882 | A * | 1/1981 | Yasujima et al. | 250/339.06 |
| 4,427,306 | A * | 1/1984 | Adamson | 374/128 |
| 4,741,626 | A * | 5/1988 | Hashimoto | 374/133 |
| 4,900,162 | A * | 2/1990 | Beckman et al. | 374/132 |
| 4,907,895 | A * | 3/1990 | Everest | 374/130 |
| 5,150,969 | A * | 9/1992 | Goldberg et al. | 374/128 |
| 5,397,900 | A * | 3/1995 | Wetzler | 250/342 |
| 5,821,536 | A * | 10/1998 | Pettit | 250/339.1 |
| 6,127,679 | A | 10/2000 | Ashley et al. | |
| 6,175,113 | B1 * | 1/2001 | Ashley et al. | 250/334 |
| 6,409,198 | B1 | 6/2002 | Weimer | |
| 6,585,410 | B1 | 7/2003 | Ryan | |
| 6,605,806 | B2 * | 8/2003 | Walmsley et al. | 250/332 |

FOREIGN PATENT DOCUMENTS

| | | |
|---|---|---|
| DE | 3904122 A1 | 8/1990 |
| GB | 2305799 A | 4/1997 |

OTHER PUBLICATIONS

International Search Report and Written Opinion for PCT/US2009/056304 dated Feb. 2, 2010, 11 pgs.
English Abstract for DE3904122 (A1) published Aug. 16, 1990, 1 pg.
Machine-generated English translation of DE3904122 Description, annotated, 4 pages, retrieved Jul. 31, 2012, from http://translationportal.epo.org/emtp/translate/?ACTION=description-retrieval&COUNTRY=DE&FORMAT=docdb&KIND=A1&LOCALE=en_EP&NUMBER=3904122&OPS=ops.epo.org&ENGINE=google&SRCLANG=de&TRGLANG=en.
Machine-generated English translation of DE39904122 Claims, 2 pages, retrieved Jul. 31, 2012, from http://translationportal.epo.org/emtp/translate/?ACTION=claims-retrieval&COUNTRY=DE&FORMAT=docdb&KIND=A1&Locale=en_EP&NUMBER=3904122&OPS=ops.epo.org&ENGINE=google&SRCLANG=de&TRGLANG=en.

* cited by examiner

*Primary Examiner* — Peter Macchiarolo
*Assistant Examiner* — Tania Courson
(74) *Attorney, Agent, or Firm* — Fredrikson & Byron, PA

(57) ABSTRACT

A method and apparatus for automated field calibration of temperature sensors uses a series of readings including a reading of a known source, such as an LED, for use in calculating a factor that is compared to a reference for adjusting the sensor output signal. Calibration readings are taken more frequently after start up to compensate for sensor drift during storage, as opposed to less frequent readings during operation to compensate for slower sensor drift while operational.

20 Claims, 4 Drawing Sheets

AUTOMATED SELF CALIBRATION IN OPTICAL DETECTORS

FIELD OF THE DISCLOSURE

The disclosure generally relates to methods of non-contact temperature measurement and, more particularly, relates to a method for automated self-calibration in optical temperature detectors.

BACKGROUND OF THE DISCLOSURE

Non-contact temperature instruments allow measuring the temperature of an object at a distance and are quick to respond. These operating features are particularly helpful when measuring the temperature of an object in a harsh or dangerous environment where physical contact is not an option. Such instruments generally operate by sensing the energy emitted from objects at a temperature above absolute zero in which the radiant infrared energy emitted by the object is proportional to the fourth power of its temperature.

To develop a measurement, some devices use a shield, often called a chopper to expose a sensor or detector, alternately exposing and blocking the target object, creating a modulated signal.

Many optical sensors or detectors, such as lead sulfide detectors, exhibit long term drift in their responsiveness, that is, the output as a function of incident radiation may change over time. Devices using such detectors must be periodically recalibrated using a source of known brightness, such as an incandescent bulb. One such method of calibration requires that the device is removed from service, exposed to the incandescent bulb, and then manually recalibrated. However, this requires that the measurement of the target object be interrupted during the calibration period. If the device is being used in a process control environment, either the process must be halted or the process must run out of control during the calibration period. Waiting for the incandescent bulb to warm up and stabilize may introduce further delays in the calibration process.

One attempt at automated self-calibration used an incandescent bulb arranged so that the chopper would expose the sensor to the target object, block the target object, expose the sensor to the bulb, block the target, and again expose the sensor to the target object. This approach requires the incandescent bulb to be run continuously, introducing its own brightness drift over time as a source of error. Moreover, when operated in this manner, the device is only measuring the target object one quarter of the time, reducing both the signal-to-noise ratio and its responsiveness to changes in target radiation.

SUMMARY OF THE DISCLOSURE

A non-contact optical temperature measuring device performs automated self-calibration using a reference calibration source, such as an LED, and a series of measurements with the chopper open, the chopper closed with the calibration source off, and the chopper closed with the calibration source on. The three readings may be combined and compared to a reference value to generate a calibration factor. The ratio of the combined readings to the reference value may be used to correct for drift of the sensor. An adjustment for the temperature of the calibration source may be made to further refine the accuracy of the correction factors. The calibration source may be activated on a periodic basis determined by the drift characteristics of the sensor being used, for example, every 5-10 minutes.

Because sensor drift may be exaggerated during periods of storage, especially storage at rated temperature extremes, calibration may be performed on a more frequent basis during the start up period of the device, for example, every three to five seconds.

These and other aspects and features of the disclosure will become more readily apparent upon reading the following detailed disclosure when taken in conjunction with the accompanying drawings.

Figure 1:
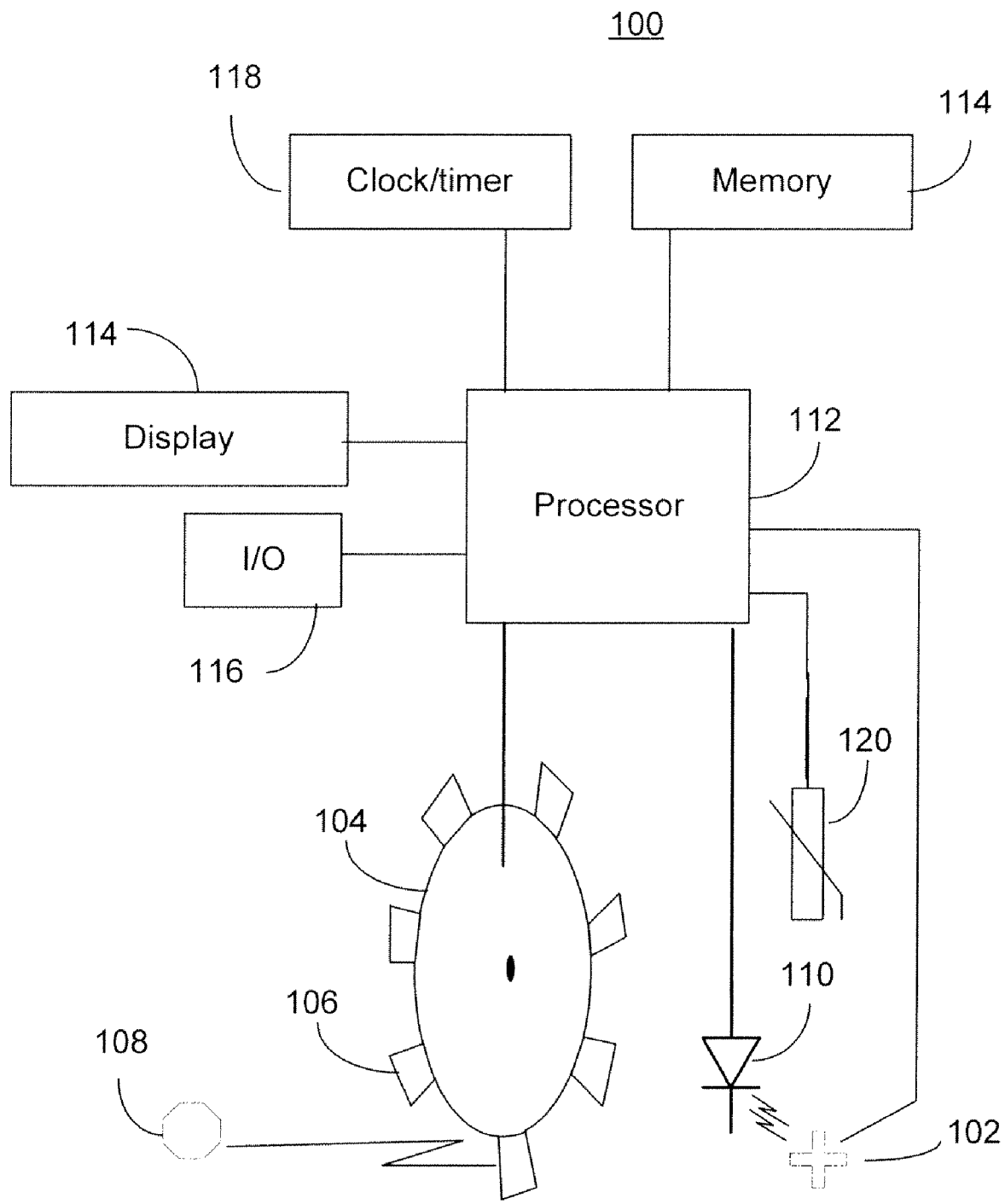
FIG. 1 is a simplified and representative block diagram of an exemplary device used in non-contact temperature sensing.

While the disclosure is susceptible to various modifications and alternative constructions, certain illustrative embodiments thereof are shown in the drawings and will be described below in detail. It should be understood, however, that there is no intention to limit the disclosure to the specific embodiments disclosed, but on the contrary, the intention is to cover all modifications, alternative constructions, and equivalents falling within the spirit and scope of the disclosure as defined by the appended claims.

DETAILED DESCRIPTION

Referring now to the drawings, and with specific reference to FIG. 1, an apparatus for measuring temperature constructed in accordance with the teachings of the disclosure is generally referred to by reference numeral 100. While the apparatus 100 can be used to measure the temperature of many objects, examples include, but are not limited to metal, glass, ceramics, and plastic.

FIG. 1 shows the apparatus 100 for measuring temperature in block diagram format. The apparatus 100 may include a sensor 102, a chopper 104 having teeth or flags 106 operable to block or pass radiation from a target object 108. The apparatus 100 may also include a calibration source 110, shown in this exemplary embodiment as a light emitting diode (LED). A processor 112 may be used to control operation of the chopper 104 and LED 110, as well as receive output signals from the sensor 102. A memory 114 may be coupled to the processor and used to store in process readings, calibration data, executable code, lookup tables, etc. A display 114 may be used to read out temperatures measured by the sensor 102 as well as support calibration and device set up. An input/output (I/O) device 116 may be coupled to the processor and used to communicate measurement data, set up information, alarms, etc. with a process controller or other management station.

A clock or timer 118 may be used to measure intervals, both for operation of the chopper 104 as well as setting the time between measurements using the calibration source 110. In some embodiments, the readings associated with the calibration source, for example, LED 110, may require temperature compensation. Thermistor 120 may be used to measure the temperature of the calibration source 110 and appropriately adjust for changes in brightness vs. temperature. For example, a quadratic correction of the LED reading using measured temperature at the LED may be used.

The sensor 102 may be any of a variety of known sensors, for example lead sulfide, lead selenide, or mercury cadmium telluride. The chopper 104 may be a physical wheel with teeth 106 or may be a piezoelectric actuator attached to a flag used to pass or block radiation from the target object 108. The chopper 104 may be responsive to control signals from the processor 112 for determining rotation speed or duty cycle or both. Alternatively, the processor 112 may simply sense chopper 104 activity and adjust calculations accordingly, if needed. The processor 112 may be a known single-chip computer or programmable logic controller and may include an analog to digital converter for conversion of the analog signal from the sensor 102 to a digital form for storage or further processing. The memory 114 may include both volatile and nonvolatile memory and may be used for both long-term storage of programs and settings as well as for storing process data generated during operation. The display 114 and I/O 116 may be known conventional devices suited to the task and operating environment. For example, in one embodiment the I/O may be a simple RS-232 serial interface, while a high-speed Ethernet (HSE) or other industrial standard may be used in a process control environment.

Figure 2:
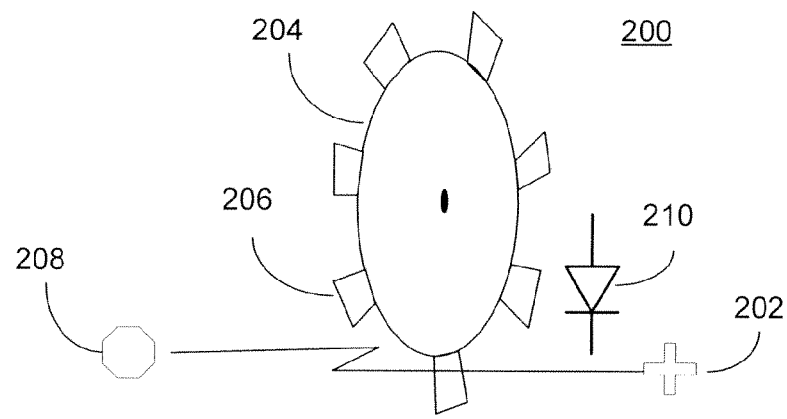
FIG. 2 through FIG. 4 are simplified and representative block diagrams showing exemplary device configurations for various readings taken by the device.
Figure 3:
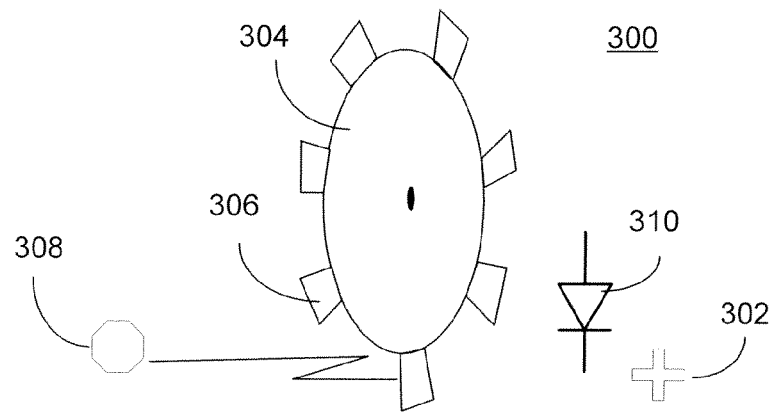
Figure 4:
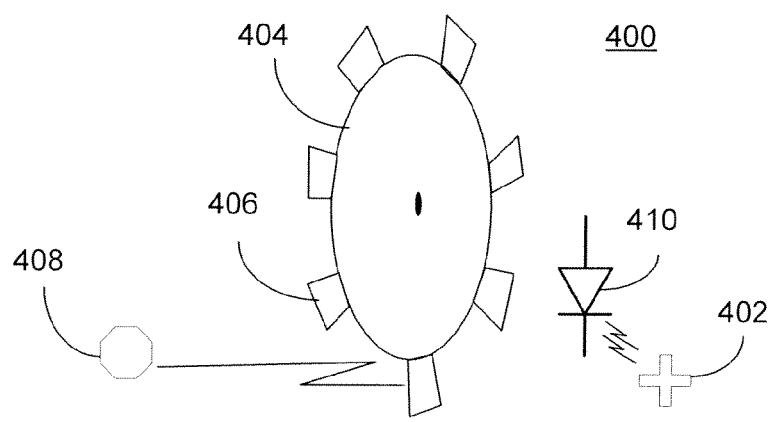

FIGS. 2, 3 and 4 show only those portions of the apparatus 100 required to illustrate various measurements taken in the calibration process.

FIG. 2 illustrates the apparatus 200 showing only the sensor 202, chopper 204 with teeth 206, target object 208, and LED 210. As illustrated, the chopper wheel is positioned so that radiation from the target object 208 passes directly to the sensor 202. A signal proportional to the incident radiation may be transferred from the sensor 202 to the processor (not depicted).

FIG. 3 also illustrates an apparatus 300 with sensor 302, chopper 304, teeth 306, target object 308, and LED 310. As illustrated, the chopper 304 has turned so that one of the teeth 306 has blocked the incident radiation from target object 308. In one exemplary embodiment, the chopper 304 is turned to create alternating illuminating and blocking of the sensor 302 at a rate in the range of 260 to 320 Hz.

FIG. 4 illustrates an apparatus 400 with sensor 402, chopper 404 with teeth 406, target object 408, and LED 410. In this illustration, the chopper teeth 406 block incident radiation from the target object 408 while the LED 410 is illuminated under the control of the processor (not depicted). A signal corresponding to the radiation emitted by the LED is forwarded to the processor.

In operation, the apparatus 100 alternately takes readings at the sensor 102 of the target object 108 and a quiet value when the shutter 104 is closed to create a modulated signal output. In one embodiment, the ideal duty cycle between shutter open and closed is 50%. However, variations in manufacture and shutter operation may result in duty cycles that are not 50%. As discussed below, this variation in duty cycle may be measured and compensated for using a factor in the calibration equation.

To calibrate for long-term drift, a calibration reading may be taken periodically, for example, every several minutes or approximately every 50,000 shutter cycles. A calibration cycle may include a first reading of the chopper closed with the calibration source off and a second reading with the chopper open. These first two readings are identical to normal readings taken during operation. A third reading may be taken with the chopper closed and the calibration source on. The third reading may be temperature corrected as discussed above. It is easily seen that this singular third reading after a significant number of normal readings neither materially reduces the signal to noise of the measurement process nor jeopardizes an associated controlled process.

To calibrate for short-term drift after power up, the same three readings may be taken and processed, only on a much faster time period. For example, calibration readings may be taken every several seconds or approximately every 1,000 shutter cycles.

Figure 5:
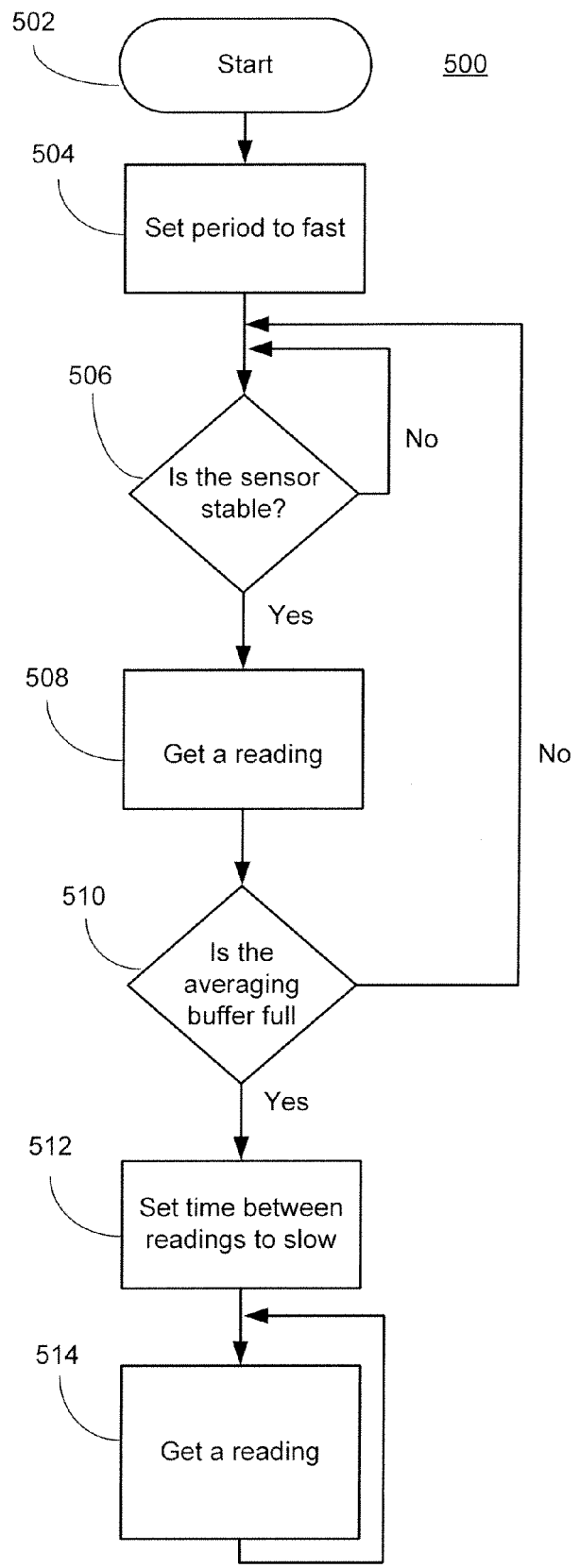
FIG. 5 is a flowchart illustrating an exemplary method of self calibration during operation over a period including initial device startup.
Figure 6:
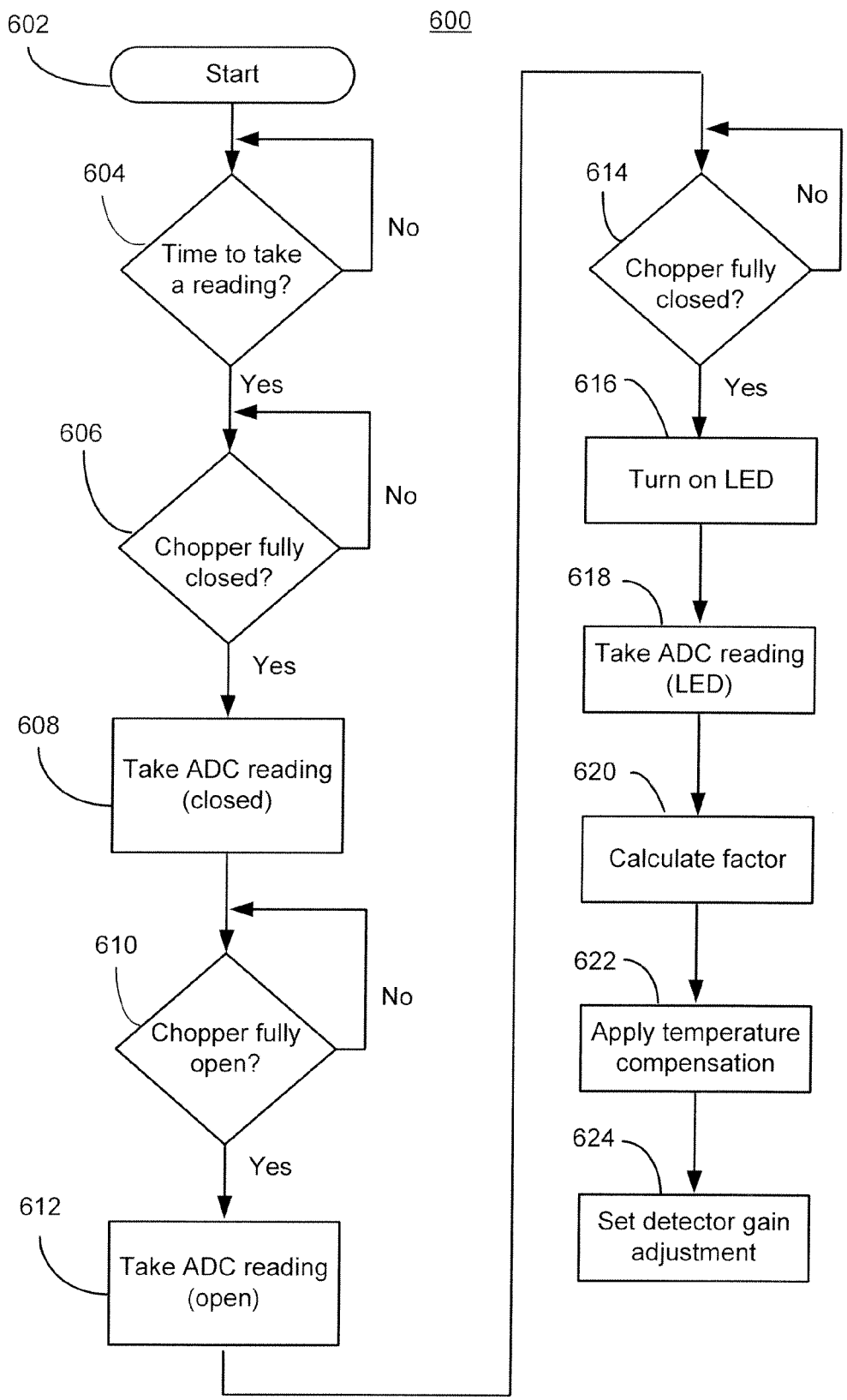
FIG. 6 is a flowchart illustrating an exemplary method of collecting and applying readings used for self calibration.

Operation and self-calibration of the apparatus 100 is discussed in more detail with respect to FIG. 5 and FIG. 6, following. Sensors of the type commonly employed in optical thermal measurement devices may exhibit two kinds of drift. During long-term operation, a relatively slow drift is common. Capturing the data required to compensate for this slow drift may occur over a period of hours, or even days, and may be averaged with previous readings to smooth the calibration corrections. A second kind of drift may occur after storage, particularly after storage for long period of time at the extremes of its rated storage temperature. During operation after power up, this relatively fast drift may require compensation at a much quicker interval, for example, using measurements taken every several seconds.

FIG. 5 is a flowchart illustrating a method 500 of operating an optical temperature measurement device, such as apparatus 100 of FIG. 1. At block 502, the apparatus may be started. As mentioned above, because the sensor 102 may drift when powered off, the calibration measurement period may be set to 'fast' at block 504. At block 506, the apparatus 100 waits for the sensor 102 to stabilize so that measurements may begin. At block 508, readings may be taken and stored at the fast rate, for example, one calibration reading every 3-5 seconds. The current reading may be stored in a buffer area of memory 114 and averaged with previous readings already stored in the buffer. At block 510, a determination may be made as to whether the buffer is full. If the buffer is not full, the no branch may be followed and an additional reading may be taken and used in the average.

If, at block 510, the averaging buffer is full, the yes branch may be followed to block 512. The averaging buffer size may be adjusted so that the expected short-term drift period is accommodated, or the cycles through the loop at block 510 may be adjusted accordingly. At block 512, the time between calibration readings may be set to the longer measurement period, appropriate for correcting the slow drift associated with normal operation. At block 514, calibration readings may be taken at the rate set by the longer period, for example, 10,000 cycles or greater.

FIG. 6, a flowchart illustrating an exemplary method 600 of collecting and applying readings for self-calibration, is discussed and described. The method of FIG. 6 may apply to the "get a reading" blocks 508 and 514 of FIG. 5. From a start at block 602 a determination is made at block 604 whether it is time to take a reading. If not, a delay is invoked as the no branch is followed from block 604 back to block 604. When it is time to take a reading, the yes branch from block 604 may be taken to block 606. If the chopper is not fully closed, the process waits until the chopper is fully closed, ensuring that radiation from the target object 108 is isolated from the sensor 102. When the chopper is fully closed, processing continues at block 608, where a first reading is taken and the analog output of the sensor 102 may be converted to a digital reading in an analog to digital converter (ADC), such as may be found in processor 112. After the first reading at block 608, the chopper is monitored at block 610 until it is fully open. When fully open, a reading is taken at block 612. This reading corresponds to radiation emitted from the target object 108.

At block 614, the chopper is again monitored until it is fully closed. When closed, the calibration source 110, for example, an LED, may be turned on at block 616. At block 618, another reading is taken corresponding to radiation emitted from the calibration source 110. Using these three readings a factor may be calculated at block 620. A calculation may be used to determine the factor: factor=reference number/((second reading−first reading)*n+third reading), where n is a measured number corresponding to the duty cycle of the chopper, approximately 0.5. The reference number is a number developed during calibration of the apparatus 100, for example, as part of the manufacturing process. At block 622 the temperature of the calibration source 110 may be compensated and at block 624 the detector gain adjustment, or calibration, may be applied.

In an exemplary embodiment, the temperature corrected factor at block 622 may be stored in a buffer of recent readings and averaged, and the average value resulting is used to apply to the gain adjustment for readings until the next calibration cycle.

The aforementioned disclosure presents a method and apparatus offering significant benefits to users of optical thermal measurements. On-going calibration may be carried out during both early power-on use and over long periods, without interrupting operation for calibration and without introducing excessive noise or calibration source drift error.

The foregoing description of temperature measurement devices, methods of measuring temperature and determining calibration values for optical sensors have been set forth merely to illustrate the disclosure and are not intended to be limiting. Because modifications of the disclosed embodiments incorporating the spirit and substance of the disclosure may occur to persons skilled in the art, the disclosure should be construed to include everything within the scope of the claims to be presented and equivalents thereof.

What is claimed is:

1. A method of compensating for drift in a sensor of a device used to measure the temperature of a target, the device having a stable calibration source and a chopper for isolating the sensor when closed, the method comprising:
   collecting a first reading with the chopper closed and the stable calibration source off;
   collecting a second reading with the chopper open;
   collecting a third reading with the chopper closed and the stable calibration source on;
   calculating a source reading using the first, second, and third readings;
   calculating a factor using the source reading and a calibration reading; and
   compensating for drift using the factor.

2. The method of claim 1, further comprising determining a period for collecting the first, the second, and the third readings.

3. The method of claim 2, wherein the period is on the order of seconds after an initial power-up of the sensor.

4. The method of claim 2, wherein the period is on the order of minutes after the sensor has stabilized from an initial power-up.

5. The method of claim 1, wherein the third reading is corrected for temperature of the stable calibration source.

6. The method of claim 1, wherein the stable calibration source is a light-emitting diode (LED) capable of exciting the sensor.

7. The method of claim 6, wherein the LED is temperature compensated using a thermistor.

8. The method of claim 1, wherein calculating the source reading comprises: source reading=((second reading−first reading)*n+third reading), where n is a measured number approximately equal to 0.5.

9. The method of claim 1, wherein calculating the factor using the source reading and the calibration reading comprises: factor=calibration reading/source reading.

10. The apparatus of claim 1, wherein the stable calibration source is a light emitting diode (LED).

11. An apparatus for optically measuring temperature adapted for automated self calibration comprising:
   a sensor responsive to light emission, the sensor susceptible to output drift over time;
   a chopper for isolating the sensor from a target when closed;
   a stable calibration source switchably operable for illuminating the sensor and capable of exciting the sensor;
   a memory for storing reading data and calibration data; and
   a processor coupled to the memory, the stable calibration source, the chopper, and the sensor, operable to collect readings at an interval of time, the readings comprising a first reading with the chopper closed and the stable calibration source off, a second reading with the chopper open, and a third reading with the chopper closed and the stable calibration source on, wherein output drift is compensated by applying a factor calculated from the first, second and third readings.

12. The apparatus of claim 11, further comprising a clock for measuring the interval of time.

13. The apparatus of claim 11, wherein the interval is shorter after the device has been turned off than the interval when the device has been in operation through a warm up period.

14. The apparatus of claim 13, wherein the warm up period is in the range of 8 to 17 minutes.

15. The apparatus of claim 11, wherein the factor is calculated against a reference number as: factor=reference number/((second reading−first reading)*n+third reading), where n is a measured number approximately equal to 0.5.

16. The apparatus of claim 15, wherein n corresponds to a duty cycle of the chopper.

17. The apparatus of claim 11, wherein the sensor is a lead sulfide sensor.

18. A method of automated field calibration of a detector comprising a sensor and a chopper and used in optical temperature sensing of a target comprising:
   determining a reference setting in a controlled environment;
   storing the reference setting;
   during detector operation, collecting a first reading with the chopper closed, blocking the sensor from the target;
   collecting a second reading with chopper open;
   collecting a third reading with the chopper closed and a calibration source on; and
   calibrating the detector by compensating for sensor drift using a factor calculated using the reference setting, the first reading, the second reading, and the third reading.

19. The method of claim 18, wherein the first and second readings are taken at a rate of several hundred per second and the third reading is taken between once an hour and once a day and calibrating the detector occurs at the rate of the third reading.

20. The method of claim 18, wherein the calibrating the detector by compensating for sensor drift using a factor comprises calibrating the detector for sensor drift using a factor calculated as: factor=reference setting/((second reading−first reading)*n+third reading), where n is a measured number approximately equal to 0.5.

* * * * *